United States Patent [19]

Wallace

[11] Patent Number: 4,915,423

[45] Date of Patent: Apr. 10, 1990

[54] REMOTE RELEASE COUPLING

[76] Inventor: Tom B. Wallace, 3 Villa Del Lago, Kings Avenue, Windsor, Johannesburg, South Africa, 2194

[21] Appl. No.: 362,318

[22] Filed: Jun. 6, 1989

[30] Foreign Application Priority Data

Jun. 9, 1988 [ZA] South Africa ............... 88/4095
Jun. 23, 1988 [ZA] South Africa ............... 88/4502

[51] Int. Cl.⁴ ............................................. F16L 55/00
[52] U.S. Cl. ................................. 285/91; 285/178; 285/330; 285/370; 403/341
[58] Field of Search ............... 285/370, 176, 397, 330, 285/375, 922, 91; 464/161, 164; 403/341

[56] References Cited

U.S. PATENT DOCUMENTS

| | | | |
|---|---|---|---|
| 1,524,677 | 2/1925 | Thompson | 285/922 X |
| 1,883,071 | 10/1932 | Stone | 285/922 X |
| 2,094,416 | 9/1937 | Sheffield | 403/341 X |
| 2,118,350 | 5/1930 | Holt | 285/422 |
| 2,307,275 | 1/1943 | Johnson | 285/330 X |
| 2,423,069 | 6/1947 | McElhose et al. | 285/330 X |

Primary Examiner—Dave W. Arola
Attorney, Agent, or Firm—Bernard, Rothwell & Brown

[57] ABSTRACT

A releasable coupling 10 includes a first element 12 which is rotatable about a rotational axis 18. A second element 14 is axially aligned with the first element 12, the first element 12 and the second element 14 being axially displaceable relative to each other. The first element 12 and the second element 14 define complementary drive formations 24, 26 which, when the first element 12 and the second element 14 abut axially are engaged with each other, and when the first element 12 and the second element 14 are spaced axially from each other by a predetermined amount are disengaged from each other. A connecting member 16 releasably couples the first element 12 and the second element 14 together, the connecting member 16 being connected to the first element 12 and the second element 14 in such a manner that, when the drive formations 24, 26 of the first element 12 and the second element 14 are disengaged and the first element 12 is rotated in a predetermined direction, the connecting member 16 is disconnected from the second element 14.

10 Claims, 3 Drawing Sheets

REMOTE RELEASE COUPLING

FIELD OF THE INVENTION

This invention relates to a coupling for connecting together two components in a string, the coupling being remotely operable to release the two components. The coupling is intended particularly, but not exclusively, for use with drilling equipment.

SUMMARY OF THE INVENTION

According to the invention there is provided a releasable coupling which includes
- a first element which is rotatable about a rotational axis;
- a second element which is axially aligned with the first element, the first element and the second element being axially displaceable relative to each other, the first element and the second element defining complementary drive formations which, when the first element and the second element abut axially are engaged with each other, and when the first element and the second element are spaced axially from each other by a predetermined amount are disengaged from each other; and
- a connecting member for releasably coupling the first element and the second element together, the connecting member being connected to the first element and the second element in such a manner that, when the drive formations of the first element and the second element are disengaged and the first element is rotated in a predetermined direction, the connecting member is disconnected from the second element.

The first element may be axially displaceable relative to the connecting member at least by the said predetermined amount for enabling the first element to be displaced axially relative to the second element to disengage the drive formations while still being connected to, and rotatably fast with, the connecting member.

The coupling may include an urging means for urging the first element and the second element into abutment such that their drive formations engage each other. The urging means may comprise a resiliently compressible element.

The first element and the second element may be hollow and the connecting member may then be located within the first element and the second element, the connecting member being constrained against rotation relative to the first element. The connecting member may also be hollow.

The connecting member may be connected to the second element in such a manner that the application of a predetermined torque is required to disconnect the connecting member from the second element. In one embodiment of the invention, the connecting member may be connected to the second element by complementary screw-threads carried by the connecting member and the second element.

The first element and the second element may each have securing formations for securing other components to the first element and to the second element. Each securing formation may comprise a screw-thread which is of an opposite direction to the screw-thread by means of which the connecting member is connected to the second element. In other words, the securing formations may be right-hand screw-threads whereas the screw-thread connecting the connecting member to the second element may then be a left-hand screw-thread.

In a preferred form of the invention, the drive formations may be suitably shaped so that when the first element and the second element are in axial abutment, the drive formation of the first element imparts a drive to the second element irrespective of the direction of rotation of the first element.

The invention extends also to a string of drilling equipment which includes a releasable coupling as described above.

The string may be a drill string, or it may comprise casing or shell components. If the string is a drill string, the coupling may be located just above a drill head or bit. Further, the coupling as described above may also be used in operations were matter is to be placed in a drill hole, for example, to place a wedge in a drill hole.

By means of the invention, if a component gets stuck, drilling equipment above the component which is stuck may easily and reliably be uncoupled and recovered, merely by lifting the drill string such that the drive formations of the first element and second element are disengaged and thereafter rotating the drill string in its conventional direction.

The invention is now described by way of an examples, with reference to the accompanying diagrammatic drawings.

DETAILED DESCRIPTION OF THE INVENTION

Figure 1:
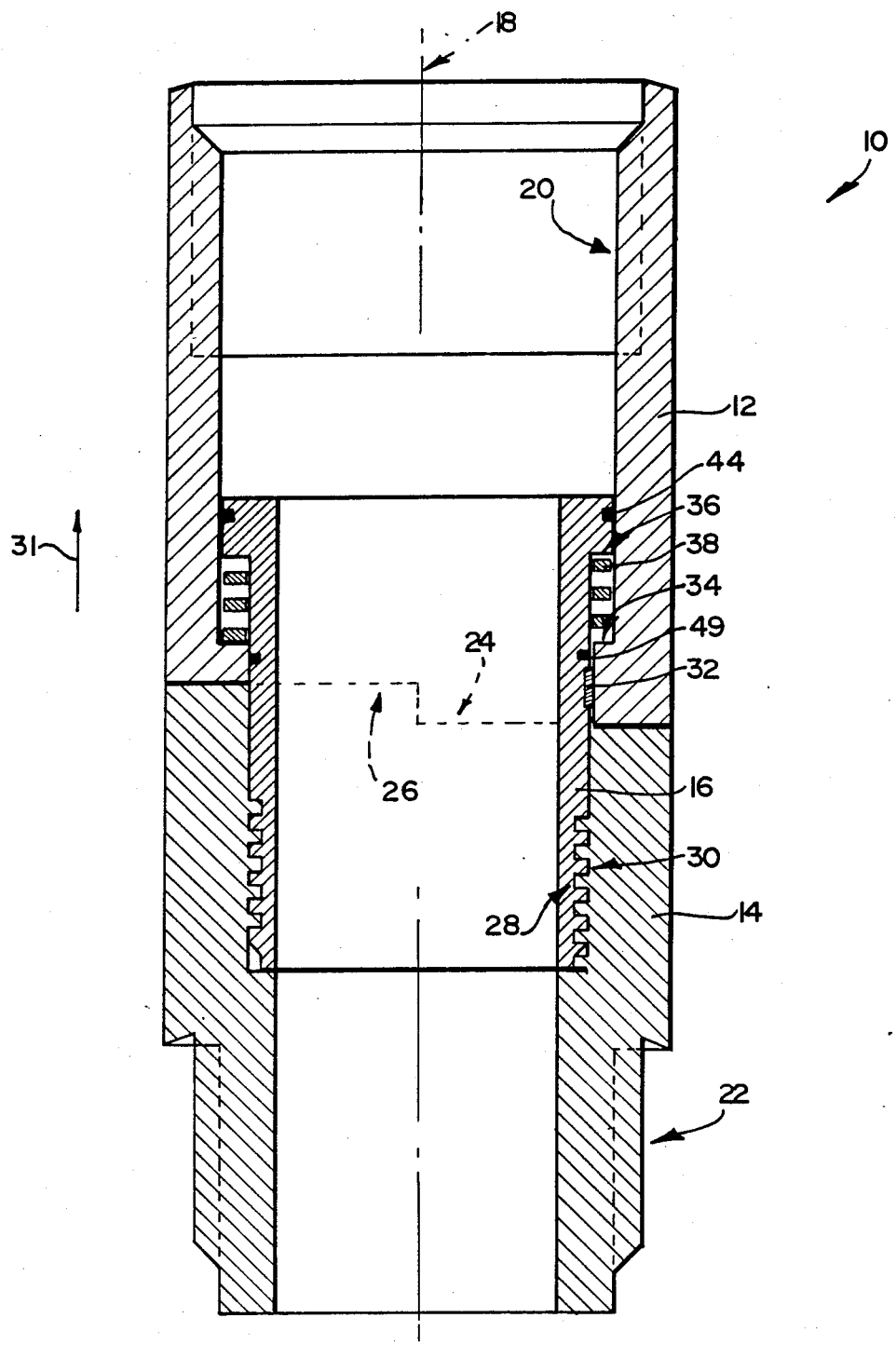
FIG. 1 shows an axial sectional view of a releasable coupling in accordance with a first embodiment of the invention.

Referring firstly to FIG. 1 of the drawings, a releasable coupling in accordance with the invention is designated generally by the reference numeral 10. The coupling 10 comprises three basic components, a first element or upper barrel 12, a second element or lower barrel 14 and a tubular connecting member 16.

The barrels 12 and 14 are circular in cross section and are hollow. The connecting member 16 is also hollow and fits within the barrels 12 and 14 and interconnects the barrels 12 and 14, as will be discussed below. The barrels 12 and 14 and the connecting member 16 are rotatable about a rotational axis 18.

The upper barrel 12 has an internal right-hand screw-thread 20 at its operatively upper end. Similarly, the lower barrel 14 has an external right-hand screw-thread 22 at its operatively lower end. A drive formation in the form of a dog 24 is defined at the lower end of the upper barrel 12 and a complementary dog 26 is defined at the upper end of the lower barrel 14. The dogs 24 and 26 engage with each other when the barrels 12 and 14 are in axial abutment. Hence, it will be appreciated that when the barrels 12 and 14 are in axial abutment they are rotatably fast with each other and rotation of either barrel in a clockwise or anti-clockwise direction will cause the other barrel to rotate together therewith in the same direction. Conversely, if the barrels 12 and 14 are axially displaced with respect to each other so that the dogs 24 and 26 are disengaged, the barrels 12 and 14 will be free to rotate independently of each other.

The connecting member 16 has an external left-hand screw-thread 28 at its lower end which engages with a complementary internal left-hand screw-thread 30 adjacent the upper end of the lower barrel 14. Accordingly, the connecting member 16 is disconnectable from the lower barrel 14 when the upper barrel 12 is axially displaced therefrom in the direction of the arrow 31 so that the dogs 24 and 26 disengage and the upper barrel 12 is rotated in a clockwise direction when viewed from above.

In this embodiment of the invention, the connecting member 16 is constrained against rotation relative to the upper barrel 12 by means of a key 32 which is insertable into corresponding keyways defined in the connecting member 16 and the upper barrel 12. Thus, the connecting member 16 is rotatably fast with the upper barrel 12 irrespective of the direction in which the upper barrel 12 is rotated but the upper barrel 12 is nonetheless axially displaceable relative to the connecting member 16. The extent to which the upper barrel 12 can move axially relative to the connecting member 16 is limited by means of a shoulder 34 defined in the bore of the upper barrel 12 and an outwardly extending flange 36 defined at the upper end of the connecting member 16. A resiliently compressible element in the form of a spring 38 is located between the shoulder 34 and the flange 36.

Hence, it will be appreciated that the upper barrel 12 can be raised relative to the connecting member 16 and the lower barrel 14 to facilitate disengagement of the dogs 24 and 26 so that if the upper barrel 12 is rotated in a clockwise direction when viewed from above, the connecting member 16 will also be rotated and, if rotation of the lower barrel 14 is impeded because some component below it is stuck, the connecting member 16 will rotate together with the upper barrel 12 relative to the lower barrel 14 thereby to disconnect the lower barrel 14 and any components connected to it from the upper barrel 12.

Figure 2:
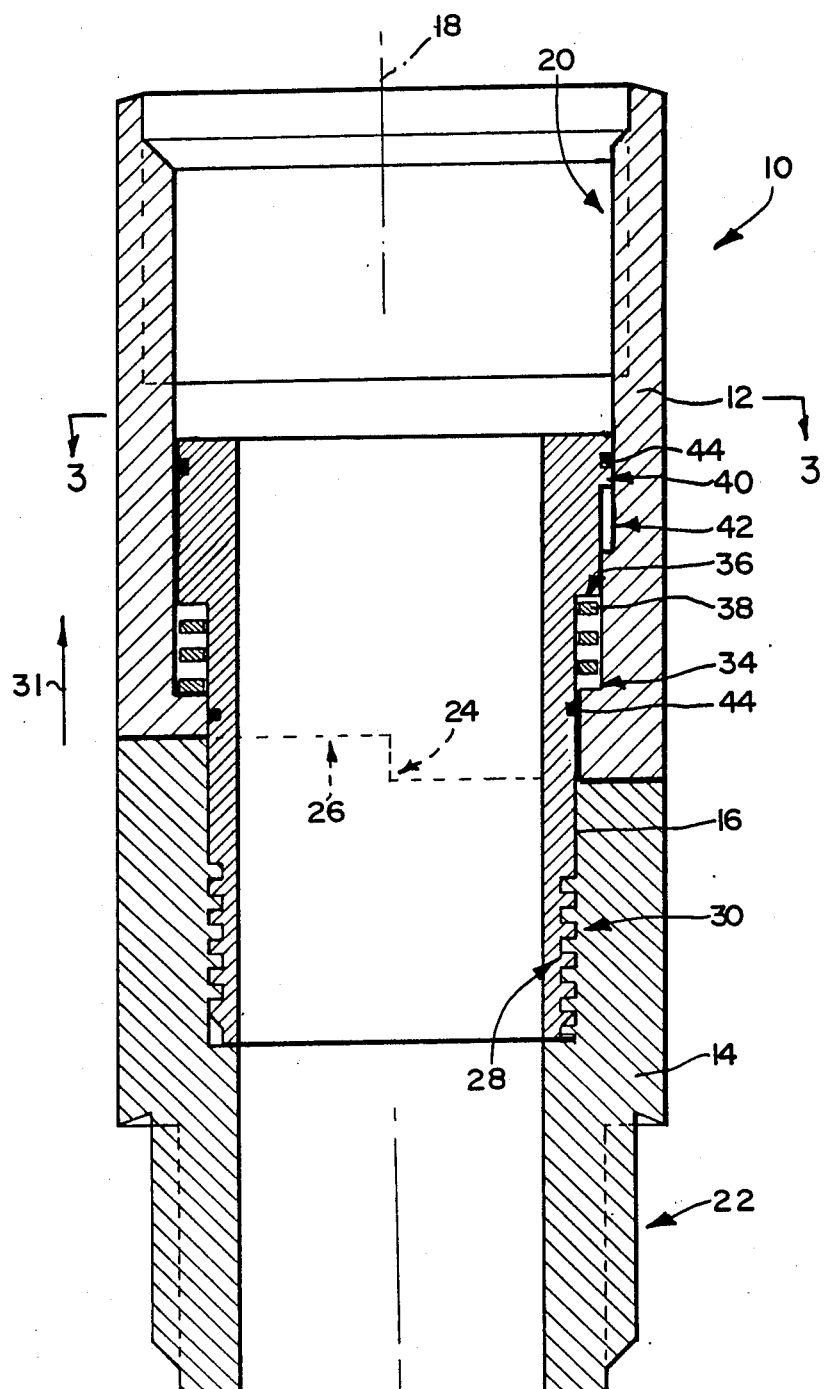
FIG. 2 shows an axial sectional view of a releasable coupling in accordance with a second embodiment of the invention.
Figure 3:
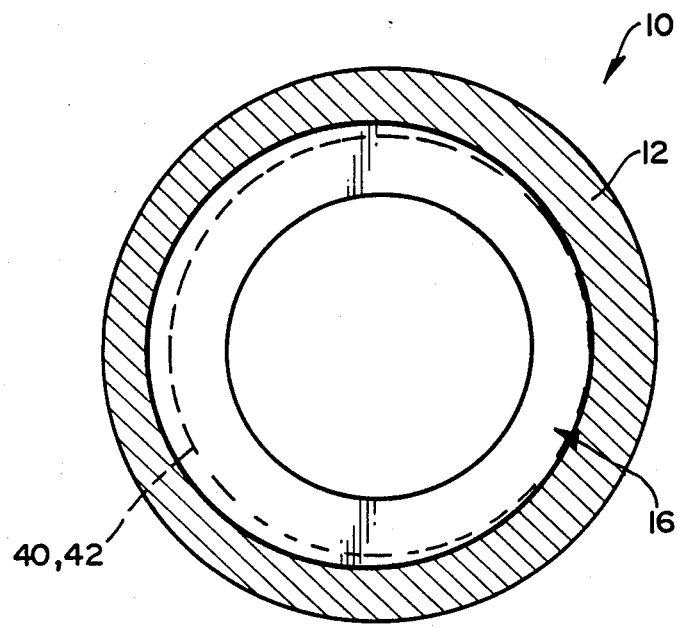
FIG. 3 shows a cross-sectional view of the coupling of FIG. 2 taken along line III—III in FIG. 2.

Referring now FIGS. 2 and 3 of the drawings, another embodiment of the coupling is illustrated. With reference to FIG. 1, like reference numerals refer to like parts unless otherwise specified.

In this embodiment of the invention, instead of the keyway 32, the connecting member 16 has an eccentrically arranged shoulder 40 which seats in an eccentric portion 42 of the bore of the upper barrel 12 thereby to inhibit rotation of the connecting member 16 relative to the upper barrel 12. With this construction, axial displacement of the upper barrel 12 relative to the connecting member 16 is still possible.

O-ring seal 44 are provided in the connecting member 16 on opposed sides of a chamber defined between the shoulder 34 and the flange 36 in which the spring 38 is contained thereby to inhibit the entry of any foreign bodies into the said chamber.

The coupling 10 in accordance with the invention is intended particularly for use with a drill string (not shown). Normally, such a coupling would be arranged immediately above a drill bit or head in the string, the drill or head, or other component being connected to the lower barrel 14 via the thread 22. Similarly, components of the drill string above the coupling 10 are connected to the upper barrel 12 via the thread 20.

Hence, if the drill bit or other component below the lower barrel 14 becomes stuck, and it is necessary to release the coupling 10 remotely, the string is raised such that the dogs 24 and 26 of the upper barrel 12 and the lower barrel 14, respectively, are disengaged. The upper barrel 12 is then rotated in its normal operating direction, clockwise when viewed from above in the embodiments illustrated, to cause the connecting member 16 to be disconnected from the lower barrel. As a result, the likelihood of disconnection taking place at any point in the drill string other than at the coupling 10 is reduced.

Hence, it is an advantage of the invention, that by means of the coupling 10, if a component of the drill string gets stuck, drilling equipment and components of the string above the stuck component can be easily and reliable uncoupled and recovered merely by lifting the string and rotating it in its normal direction. Hence, all that will be lost in the event of the drill string becoming stuck are those components of the string below the lower barrel 14 and the lower barrel 14 itself.

What is claimed is:

1. A releasable coupling which includes
   a first hollow element which is rotatable about a rotational axis;
   a second hollow element which is axially aligned with the first element, the first element and the second element being axially displaceable relative to each other, the first element and the second element defining complementary drive formations which, when the first element and the second element abut axially are engaged with each other, and when the first element and the second element are spaced axially from each other by a predetermined amount are disengaged from each other; and
   a connecting member which fits within the first element and the second element for releasably coupling the first and the second element together, the connecting member and the first element having complementary restraining formations for inhibiting rotation of the connecting member, relative to the first element but permitting limited axial displacement of the first element relative to the connecting member and the connecting member being screw-threadedly connected to the second element by complementary screw-threads carried by the connecting member and the second element so that, when the drive formations of the first element and the second element are disengaged and the first element is rotated in a predetermined direction, the connecting member is disconnected from the second element.

2. The coupling as claimed in claim 1 in which the first element is axially displaceable relative to the connecting member at least by the said predetermined amount for enabling the first element to be displaced axially relative to the second element to disengage the drive formations while still being connected to, and rotatably fast with, the connecting member.

3. The coupling as claimed in claim 1 which includes an urging means for urging the first element and the second element into abutment such that their drive formations engage each other.

4. The coupling as claimed in claim 3 in which the urging means comprises a resiliently compressible element.

5. The coupling as claimed in claim 1 in which the complementary restraining formations of the connecting member and the first element comprise key which is insertable into corresponding keyways defined in the connecting member and the first element to inhibit rotation of the connecting member relative to the first element, the complementary restraining formations further comprising a shoulder defined in a bore of the first element and outwardly extending flange defined at an operatively upper end of the connecting member for limiting the axial displacement of the first element relative to the connecting member.

6. The coupling as claimed in claim 1 in which the first element and the second element each have securing formations for securing other components to the first element and to the second element.

7. The coupling as claimed in claim 6 in which each securing formation comprises a screw-thread which is of an opposite direction to the screw-thread by means of which the connecting member is connected to the second element.

8. The coupling as claimed in claim 1 in which the complementary restraining formations comprise an eccentrically arranged shoulder of the connecting member which seats in an eccentric portion of a bore of the first element to inhibit rotation of the connecting member relative to the first element, the complementary restraining formations further comprising a shoulder defined in the bore of the first element and an outwardly extending flange defined at an operatively upper end of the connecting member for limiting the axial displacement of the first element relative to the connecting member.

9. A releasable coupling which includes
a first hollow element which is rotatable about a rotational axis;
a second hollow element which is axially aligned with the first element, the first element and the second element being axially displaceable relative to each other, the first element and the second element defining complementary drive formations which, when the first element and the second element abut axially are engaged with each other, and when the first element and the second element are spaced axially from each other by a predetermined amount are disengaged from each other, the first element having an internal screw-thread of a first direction at its operatively upper end and the second element having an external screw-thread at is operatively lower end of the same direction as the internal screw-thread of the first element, components of a drill string being securable to the first element and the second element via the internal screw-thread and the external screw-thread, respectively; and
a connecting member which fits within the first element and the second element for releasably coupling the first element and the second element together, the connecting member being constrained against rotation relative to the first element by means of a key which is insertable into corresponding keyways defined in the connecting member and the first element, the connecting member defining an outwardly extending flange at its operatively upper end against which a shoulder defined in a bore of the first element abuts when the first element is spaced from the second element by the said predetermined amount to limit axial displacement of the first element relative to the connecting member, and the connecting member being screw-threadedly connected to the second element by complementary screw-threads carried by the connecting element and the second element, the said complemenatary screw-threads being of a direction opposite to the direction of the internal screw-thread of the first element and the external screw-thread of the second element so that, when the drive formations of the first element and the second element are disengaged and the first element is rotated in a normal drilling direction of the drill string, the connecting member is disconnected from the second element.

10. A releasable coupling which includes
a first hollow element which is rotatable about a rotational axis;
a second hollow element which is axially aligned with the first element, the first element and the second element being axially displaceable relative to each other, the first element and the second element defining complementary drive formations which, when the first element and the second element abut axially are engaged with each other, and when the first element and the second element are spaced axially from each other by a predetermined amount are disengaged from each other, the first element having an internal screw-thread of a first direction at its operatively upper end and the second element having an external screw-thread at its operatively lower end of the same direction as the internal screw-thread of the first element, components of a drill string being securable to the first element and the second element respectively; and
a connecting member which fits within the first element and the second element for releasably coupling the first element and the second element together, the connecting member having an eccentrically arranged shoulder which seats in an eccentric portion of a bore of the first element to inhibit rotation of the connecting member relative to the first element, the connecting member defining an outwardly extending flange at its operatively upper end against which a shoulder defined in the bore of the first element abuts when the first element is spaced from the second element by the said predetermined amount to limit axial displacement of the first element relative to the connecting member, and the connecting member being screw-threadedly connected to the second element by complementary screw-threads carried by the connecting element and the second element, the said complementary screw-threads being of a direction opposite to the direction of the internal screw-thread of the first element and the external screw-thread of the second element so that, when the drive formations of the first element and the second element are disengaged and the first element is rotated in a normal drilling direction of the drill string, the connecting member is disconnected from the second element.

* * * * *